United States Patent [19]

Kropelnicki

[11] 3,814,345

[45] June 4, 1974

[54] FISHING REEL WITH COAXIAL DRAG AND MOUNTING ASSEMBLIES

[76] Inventor: Matt Kropelnicki, 537 Cedar St., San Mateo, Calif. 94070

[22] Filed: Feb. 7, 1972

[21] Appl. No.: 223,884

[52] U.S. Cl.............. 242/106, 242/84.5 R, 242/99, 287/52.06
[51] Int. Cl...................... B65h 75/38, B65h 75/30
[58] Field of Search..... 242/84.5 R, 84.51 R, 84.53, 242/99, 106; 43/22, 20; 254/186; 287/52.06, 54 A, 54.1, 53

[56] References Cited
UNITED STATES PATENTS

| | | | |
|---|---|---|---|
| 1,053,612 | 2/1913 | Keyes | 242/106 |
| 1,123,642 | 1/1915 | Wright | 242/99 |
| 3,685,761 | 8/1972 | Zelinski | 242/84.5 R |
| 1,803,231 | 4/1931 | Camblin | 242/99 |
| 1,830,890 | 11/1931 | Schat | 242/99 X |

Primary Examiner—Billy S. Taylor

[57] ABSTRACT

A reel assembly, an adjustable drag assembly for applying an adjustable drag to opposite sides of the reel assembly, and a reel mounting assembly for removably mounting the reel and adjustable drag assemblies on a pole and for releasably locking them in place on the pole are coaxially mounted on a reel shaft. The adjustable drag assembly includes a first friction disc positioned adjacent to one side of the reel assembly, and a second friction disc positioned adjacent to a spacer disc at the other side of the reel assembly. It also includes a first pressure plate positioned adjacent to the first friction disc, and an adjustable second pressure plate positioned adjacent to the second friction disc and provided with a plurality of angularly spaced drag adjustment bars. The reel mounting assembly includes a pair of clamping members, and a quick-release locking lever positioned between the adjustable second pressure plate and these clamping members.

5 Claims, 4 Drawing Figures

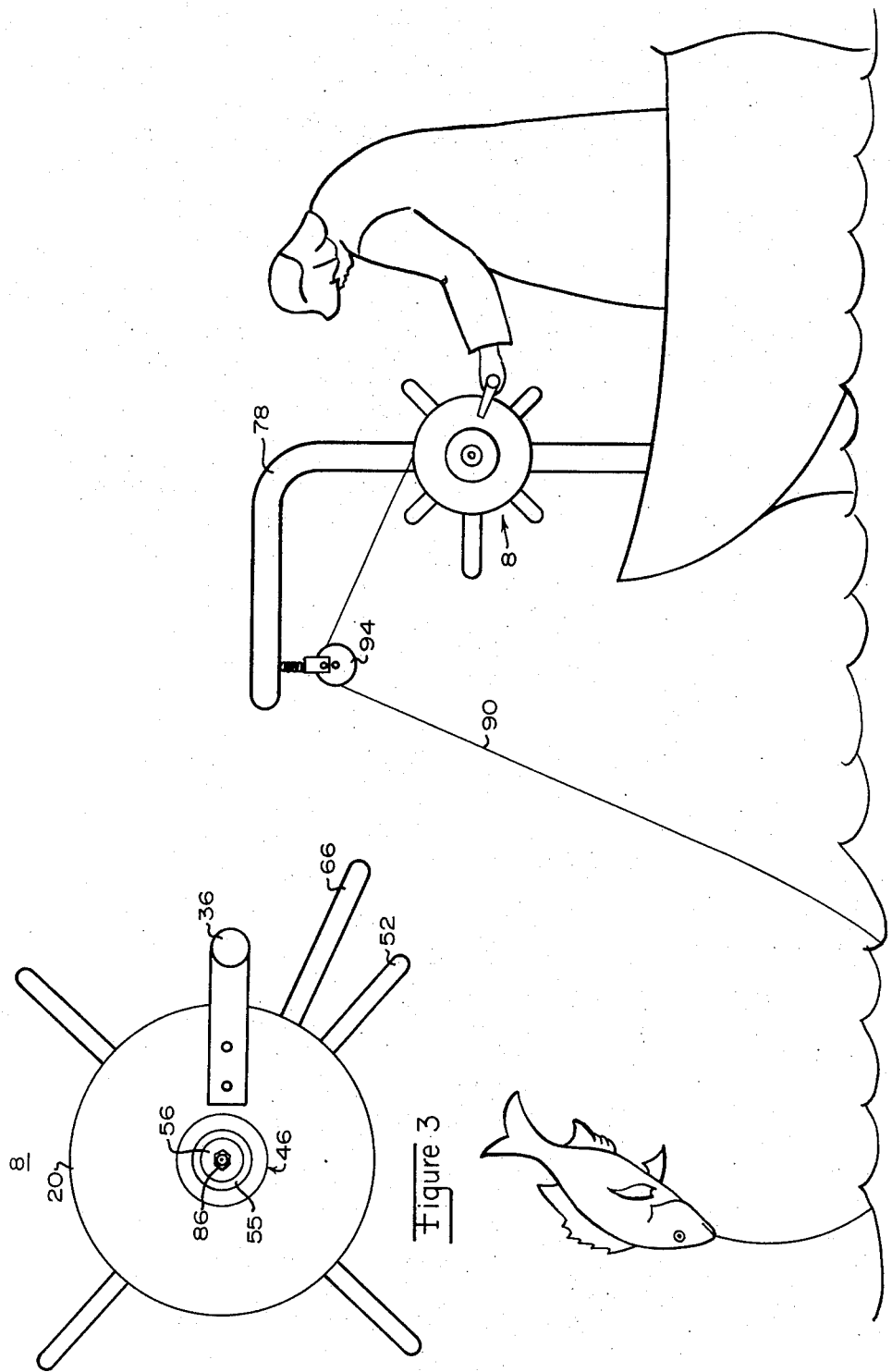

FISHING REEL WITH COAXIAL DRAG AND MOUNTING ASSEMBLIES

BACKGROUND OF THE INVENTION

This invention relates generally to reeling apparatus and, more particularly, to a rugged fishing reel with improved drag and mounting assemblies well suited for heavy duty commercial and sport fishing.

The fishing reels conventionally used for heavy duty commercial and sport fishing typically are made from cast or forged parts and typically employ reel and adjustable drag assemblies including bearings, springs, or other such critical elements. These fishing reels are therefore typically more subject to wear and failure than is desirable for this type of fishing apparatus. They also typically employ an adjustable drag assembly eccentrically mounted on one side of the reel assembly. This severely limits the overall strength of the adjustable drag assembly and, hence, the amount of drag it can apply to the reel assembly.

Nearly all conventional fishing reels are mounted on a pole by employing screws that screw into threaded mounting holes in one side of the pole, wingnuts that screw onto threaded studs on one side of the pole, collars that are slidably or threadedly mounted on the pole, or other such mounting assemblies. These mounting assemblies are generally not as strong as desired, particularly for heavy duty commercial and sport fishing, and in some cases severely limit the speed with which these fishing reels can be removed from the pole when it is desired to do so for safe keeping or any other reason.

SUMMARY OF THE INVENTION

Accordingly, the principal object of this invention is to provide an improved and more rugged fishing reel that is better suited to heavy duty commercial and sport fishing.

Another object of this invention is to provide a fishing reel having an improved and stronger adjustable drag assembly.

Still another object of this invention is to provide a fishing reel having an improved and stronger mounting assembly with provision for quickly and simply removing the fishing reel from a pole on which the fishing reel may be mounted.

These objects are accomplished according to the illustrated preferred embodiment of this invention by employing a fishing reel in which the reel assembly is rotatably and slidably mounted on a smooth intermediate portion of a reel shaft and in which the adjustable drag assembly is provided with a first fibrous friction disc slidably mounted on the smooth intermediate portion of the reel shaft adjacent to one side of the reel assembly, with a second fibrous friction disc slidably mounted on the smooth intermediate portion of the reel shaft adjacent to a spacer disc at the other side of the reel assembly, with a first pressure disc slidably mounted on the smooth intermediate portion of the reel shaft between the first friction disc and an enlarged end portion of the reel shaft, and with a second pressure disc screwed onto a threaded end portion of the reel shaft between the second friction disc and a reel mounting assembly and provided with a plurality of angularly spaced drag adjustment bars. Turning the drag adjustment bars in one direction forces the pressure discs against the friction discs and, in turn, the friction discs against the opposite sides of the reel assembly, thereby applying a frictional drag to the opposite sides of the reel assembly. This frictional drag may be increased by further turning the drag adjustment bars in the same direction and decreased by turning the drag adjustment bars in the opposite direction.

According to the illustrated preferred embodiment of this invention, the mounting assembly for this fishing reel is provided with a first clamping member screwed onto the threaded end portion of the reel shaft, with a second clamping member that may be removably attached to the first clamping member, and with a locking lever also screwed onto the threaded end portion of the reel shaft and positioned between the first clamping member and the second pressure plate. The fishing reel may be mounted on a pole by clamping the pole between the first and second clamping members and may thereupon be locked in place on the pole by turning the locking lever in one direction until it abuts upon the first clamping member. Conversely, the fishing reel may be unlocked by simply turning the locking lever a fraction of a turn in the opposite direction and may thereupon be removed from the pole, without removing the first and second clamping members, by unscrewing the threaded end portion of the reel shaft from the first clamping member.

Other and incidental objects of this invention will become apparent from a reading of this specification and an inspection of the accompanying drawings.

DESCRIPTION OF THE DRAWINGS

FIG. 3 is a side view of the fishing reel of FIGS. 1 and 2, as viewed from the side opposite that shown in FIGS. 1 and 2.

FIG. 4 shows how the fishing reel of FIGS. 1-3 may be employed in a boat.

DESCRIPTION OF THE PREFERRED EMBODIMENT

Figure 1:
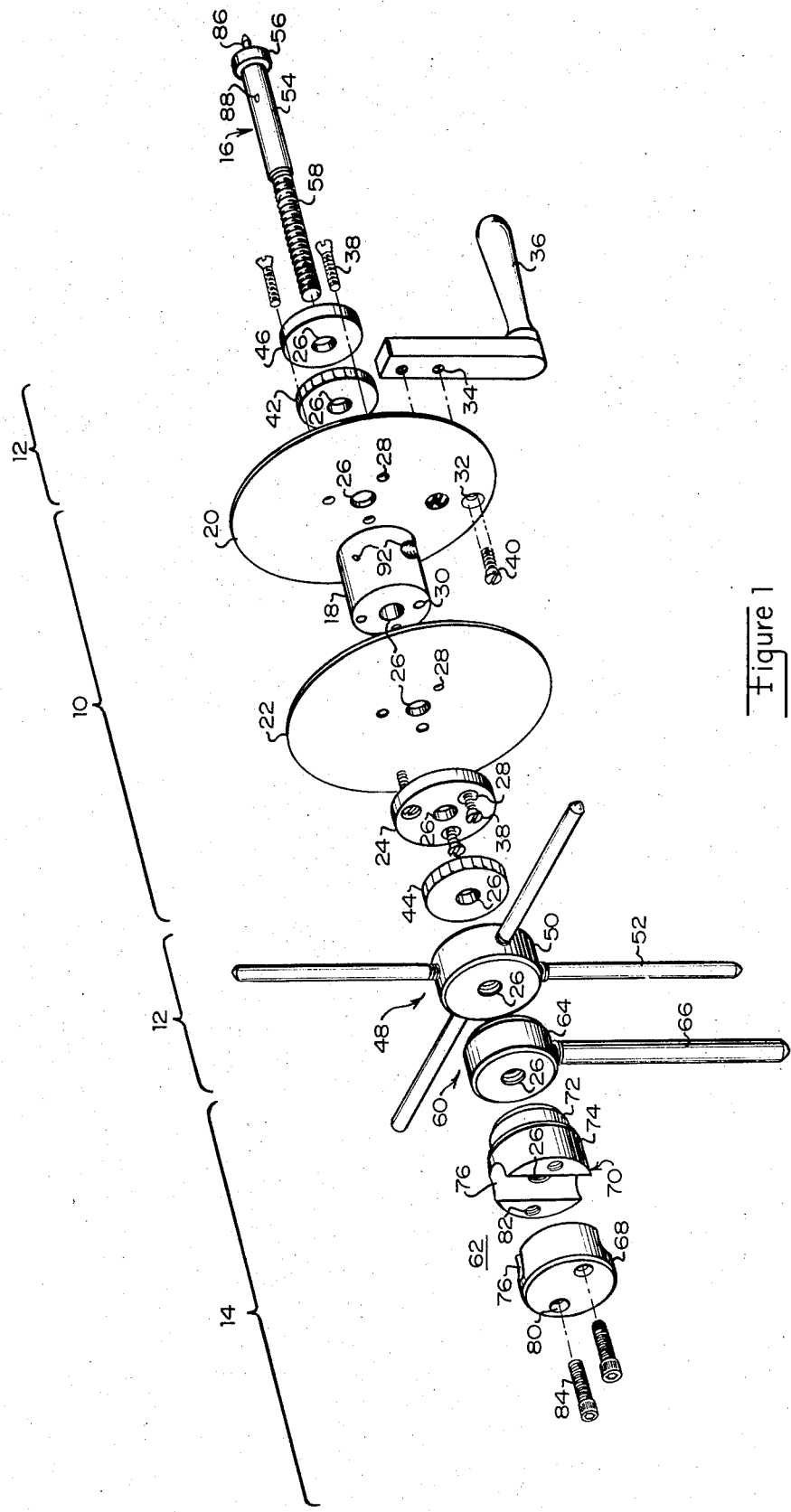
FIG. 1 is an exploded perspective view of a fishing reel according to the preferred embodiment of this invention.
Figure 2:
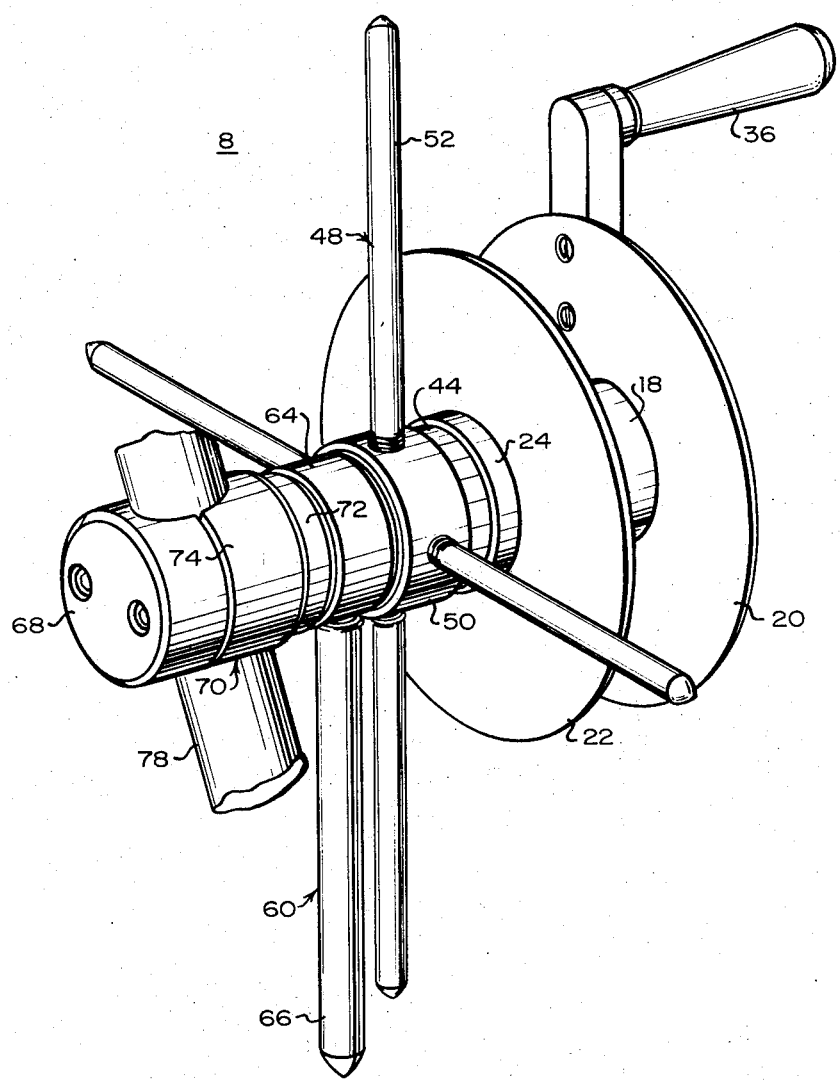
FIG. 2 is an assembled perspective view of the fishing reel of FIG. 1.

Referring to FIGS. 1-3, there is shown a fishing reel 8 constructed in accordance with the preferred embodiment of this invention. This fishing reel comprises a reel assembly 10, an adjustable drag assembly 12, and a reel mounting assembly 14 coaxially mounted on a reel shaft 16. For purposes of illustration, typical dimensions of various parts of these assemblies and the reel shaft are given in parenthesis throughout the following description.

The reel assembly 10 includes a cylindrical reel spool 18 (two and seven-sixteenths inches in diameter and two and a half inches in length), a pair of circular side plates 20 and 22 (each nine and one-quarter inches in diameter and one-quarter of an inch in thickness), and a spacer disc 24 (two and seven-eighths inches in diameter and three-eights of an inch in thickness). Each of these parts of the reel assembly is provided with a smooth, circular, central mounting hole 26 (three-quarters of an inch in diameter) for receiving reel shaft 16. Side plates 20 and 22 and spacer disc 24 are also each provided with three smooth circular mounting holes 28 (one-quarter of an inch in diameter) symmetrically positioned about the corresponding central mounting hole 26 for alignment with three threaded circular mounting holes 30 of the same diameter in each end of reel spool 18. In addition, side plate 20 is provided with two more smooth circular mounting holes 32 (one-quarter of an inch in diameter radially aligned along a peripheral portion thereof for alignment with two threaded circular mounting holes 34 of the same diameter in a handle 36 provided for the reel assembly.

Side plate 20 is coaxially aligned with reel spool 18 and is attached to one end thereof by three mounting screws 38 (one-quarter of an inch in diameter and one inch in length). These mounting screws 38 are inserted through smooth mounting holes 28 in side plate 20 and screwed into threaded mounting holes 30 in one end of reel spool 18. Side plate 22 and spacer disc 24 are also coaxially aligned with reel spool 18, side plate 22 being positioned between reel spool 18 and spacer disc 24, and are attached to the other end of reel spool 18 by three additional mounting screws 38 (one-quarter of an inch in diameter and one inch in length). These additional mounting screws 38 are inserted through smooth mounting holes 28 in spacer disc 24 and side plate 22 and screwed into threaded mounting holes 30 in this other end of reel spool 18. The smooth mounting holes 28 in side plate 20 and spacer disc 24 are countersunk so that the heads of mounting screws 38 do not protrude beyond the outer surfaces of side plate 20 and spacer disc 24. Reel handle 34 is attached to the outer face of side plate 20 by two mounting screws 40 (one-quarter of an inch in diameter and three-quarters of an inch in length). These mounting screws 40 are inserted through smooth mounting holes 32 in side plate 20 and screwed into threaded mounting holes 34 in the shank of reel handle 36. The smooth mounting holes 32 in side plate 20 are also counter-sunk so that the heads of mounting screws 40 do not protrude beyond the inner surface of side plate 20.

The adjustable drag assembly 12 includes a pair of fibrous friction discs 42 and 44 (each two and three-quarters inches in diameter and five-sixteenths of an inch in thickness), a pressure disc 46 (two and three-quarters inches in diameter and three-eighths of an inch in thickness), and a drag adjustment lever 48. Drag adjustment lever 48 comprises another pressure disc 50 (two and seven-eighths inches in diameter and one inch in thickness) and four cylindrical bars 52 (one-half inch in diameter and seven inches in length) threaded at one end thereof and screwed into four circular threaded mounting holes symmetrically positioned around the outer periphery of pressure disc 50. Side plate 20 and spacer disc 24 of the reel assembly also serve as part of the drag adjustment assembly. Like side plate 20 and spacer disc 24 of the reel assembly, each of the friction and pressure discs 42, 44, and 46 of the adjustable drag assembly is provided with a smooth, circular, central mounting hole 26 (three-quarters of an inch in diameter) for receiving reel shaft 16. Pressure disc 50 of the drag adjustment lever is similarly provided with a threaded, circular, central mounting hole 26 of the same diameter.

Pressure plate 46 is rotatably and slidably mounted on a smooth portion 54 (three-quarters of an inch in diameter and three and three-eighths inches in length) of reel shaft 16 with a recessed portion 55 of the outer surface of pressure plate 46 positioned in abutment upon an enlarged cylindrical end portion 56 (one and three-eighths inches in diameter and three-eighths of an inch in length) of the reel shaft. Friction disc 42, reel assembly 10, and friction disc 44 are similarly rotatably and slidably mounted on smooth portion 54 of the reel shaft with friction disc 42 positioned in abutment upon pressure disc 46, with side plate 20 of the reel assembly positioned in abutment upon friction disc 42, and with friction disc 44 positioned in abutment upon spacer disc 24 of the reel assembly. Pressure disc 50 of the drag adjustment lever is screwed onto a threaded end portion 58 (three-quarters of an inch in diameter and four inches in length) of the reel shaft and into abutment upon friction disc 44 to hold the reel and drag adjustment assemblies in place on the reel shaft and to control the frictional drag applied to the reel assembly by the adjustable drag assembly. This frictional drag may quickly and simply be increased or decreased by simply turning the drag adjustment lever 48 clockwise or counterclockwise, respectively.

The reel mounting assembly 14 includes a quick-release locking lever 60 and a reel mounting hub 62. Locking lever 60 comprises a pressure disc 64 (two and one half inches in diameter and one and one-eighth inches in thickness) and a cylindrical bar 66 (five-eighths of an inch in diameter and eight and three-quarters inches in length) threaded at one end and screwed into a threaded mounting hole positioned in the outer periphery of pressure disc 64. Reel mounting hub 62 comprises a first cylindrical clamping member 68 (two and seven-eighths inches in diameter and one inch in length) and a second cylindrical clamping member 70 with a first portion 72 (three-quarters of an inch in length) of the same diameter as friction disc 64 and with a second portion 74 of the same diameter and length as the first clamping member 68. Like pressure disc 50 of the drag adjustment lever, the second clamping member 70 and pressure disc 64 of the locking lever are each provided with a threaded, circular, central mounting hole 26 of the same diameter as the other central mounting holes 26. The first clamping member 68 and the second portion 74 of the second clamping member 70 are also each provided with a diametric substantially semicircular recess 76 for engaging a cylindrical reel mounting bar or pole 78 (one and one-quarter inches in diameter). In addition, the first clamping member 68 is provided with a pair of smooth circular mounting holes 80 (three-eighths of an inch in diameter) positioned adjacent to opposite sides of the corresponding semicircular recess 76 for alignment with a pair of threaded circular mounting holes 82 (also three-eighths of an inch in diameter) similarly positioned in the second portion 74 of the second clamping member.

Pressure disc 64 of the locking lever and the second clamping member 70 are screwed onto the threaded end portion 58 of reel shaft 16 with pressure disc 64 of the locking lever positioned between pressure disc 50 of the drag adjustment lever and the second clamping member 70. The fishing reel 8 may thereupon be clamped to reel mounting bar or pole 78 by two mounting screws 84 (three-eighths of an inch in diameter and one and a half inches in length). These mounting screws 84 are inserted through smooth mounting holes 80 in the first clamping member 68 and screwed into threaded mounting holes 82 in the second portion 74 of the second clamping member. The smooth mounting holes 80 in the first clamping member 68 are countersunk so that mounting screws 84 do not protrude beyond the outer face of the first clamping member. Once the fishing reel 8 is clamped to the reel mounting bar or pole 78, it may be quickly and simply locked in place by turning locking lever 60 counterclockwise until it abuts upon the first portion 72 of the second clamping member. The fishing reel 8 may be quickly and simply unlocked and removed from the reel mounting bar or pole 78, without removing the clamping members 68 and 70, by turning locking lever 60 clockwise a fraction of a turn so that it no longer abuts upon the first portion 72 of the second clamping member and by then simply unscrewing the threaded portion 58 of the reel shaft from the second clamping member 70.

Reel shaft 16, reel spool 18, side plates 20 and 22, spacer disc 24, reel handle 36, drag adjustment lever 48, locking lever 60, and the first and second clamping members 68 and 70 are all machined from solid brass raw stock and anodized to resist rust and corrosion. Stainless steel mounting screws 38, 40, and 84 are also employed to resist rust and corrosion. Friction discs 42 and 44 are formed from a fibrous oil, water, and heat-resistant material such as a laminated phenolic. The reel assembly is lubricated by simply using an automotive type of grease gun on an alemite grease fitting 86 that is screwed into a threaded central mounting hole (three-eighths of an inch in diameter) coaxially formed in the enlarged end portion 56 of the reel shaft. Grease fitting 86 communicates with the surface of the smooth portion 54 of the reel shaft at a position centrally located within the reel spool 18 via a first smooth cylindrical hole (one-eighth of an inch in diameter) coaxially extending (about one and a half inches) within the reel shaft and a second smooth cylindrical holes 88 (also one-eighth of an inch in diameter) laterally extending between this first smooth cylindrical hole and the surface of the smooth portion of the reel shaft.

As shown in FIG. 4, the fishing reel 8 may be mounted on a vertical portion of an L-shaped reel mounting bar or pole 78. A fishing line 90 may be secured at one end to the reel spool 18 by inserting it through a tapered aperture 92 (see FIG. 1) laterally extending through a peripheral portion of the reel spool. Once the fishing line is wound onto the reel spool, the other end of the fishing line may be inserted through a pulley 94 fixedly attached to a horizontal portion of reel mounting bar or pole 78 and fed out or reeled in under the control of the fisherman.

I claim:

1. Reeling apparatus comprising:
   a cylindrical shaft having a smooth portion and a threaded portion;
   a reel coaxially, rotatably, and slidably mounted on the smooth portion of said shaft;
   a pair of friction discs coaxially and slidably mounted on the smooth portion of said shaft adjacent to opposite sides of said reel;
   a first pressure disc coaxially mounted on the smooth portion of said shaft adjacent to one of said friction discs;
   drag adjustment means, including a second pressure disc coaxially screwed onto the threaded portion of said shaft adjacent to the other of said friction discs, for controlling the drag applied to the opposite sides of said reel by said friction discs and said pressure discs, said drag adjustment means also including a lever for turning said second pressure disc in one direction to increase the drag applied to the opposite sides of said reel by said friction discs and said pressure discs and for turning said second pressure disc in the opposite direction to decrease the drag applied to the opposite sides of said reel by said friction discs and said pressure discs;
   clamping means screwed onto the threaded portion of said shaft for clamping the reeling apparatus to a pole; and
   locking means screwed onto the threaded portion of said shaft between said clamping means and said drag adjustment means for locking the reeling apparatus in place on the pole to which the reeling apparatus is clamped by said clamping means.

2. Reeling apparatus as in claim 1 wherein:
   said locking means includes a third pressure disc screwed onto the threaded portion of said shaft between said clamping means and said drag adjustment means; and
   said locking means also includes a lever for turning said third pressure disc in one direction until it abuts upon said clamping means to lock the reeling apparatus in place on the pole to which the reeling apparatus is clamped by said clamping means and for subsequently turning said third pressure disc a fraction of a turn in the opposite direction to unlock the reeling apparatus.

3. Reeling apparatus comprising:
   a cylindrical shaft;
   a reel coaxially mounted on said shaft;
   clamping means coaxially and removably mounted on said shaft for straddling a pole to clamp the reeling apparatus to the pole; and
   locking means coaxially mounted on said shaft between said reel and said clamping means for engagement with said clamping means to lock the reeling apparatus in place on the pole to which the reeling apparatus is clamped.

4. Reeling apparatus as in claim 3 wherein said locking means includes:
   a pressure disc screwed onto a threaded portion of said shaft between said reel and said clamping means; and
   a lever for turning said pressure disc in one direction until it abuts upon said clamping means to lock the reeling apparatus in place on the pole to which the reeling apparatus is clamped by said clamping means and for subsequently turning said pressure disc a fraction of a turn in the opposite direction to unlock the reeling apparatus.

5. Reeling apparatus as in claim 4 wherein said clamping means includes:
   a first clamping member removably screwed onto the threaded portion of said shaft; and
   a second clamping member removably attachable to said first clamping member to clamp the pole therebetween.

* * * * *